United States Patent Office 3,352,058
Patented Nov. 14, 1967

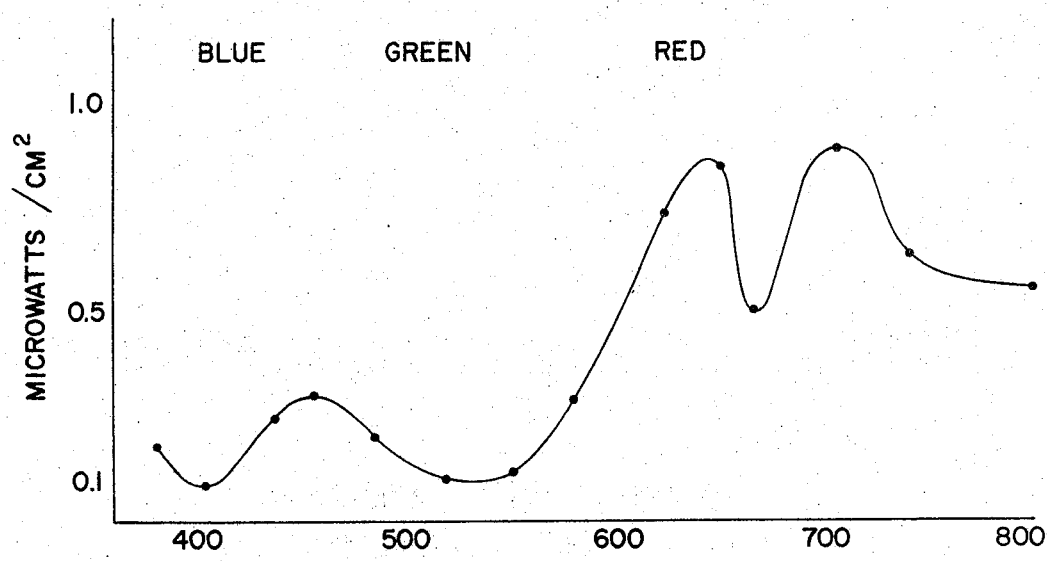
FIG_1
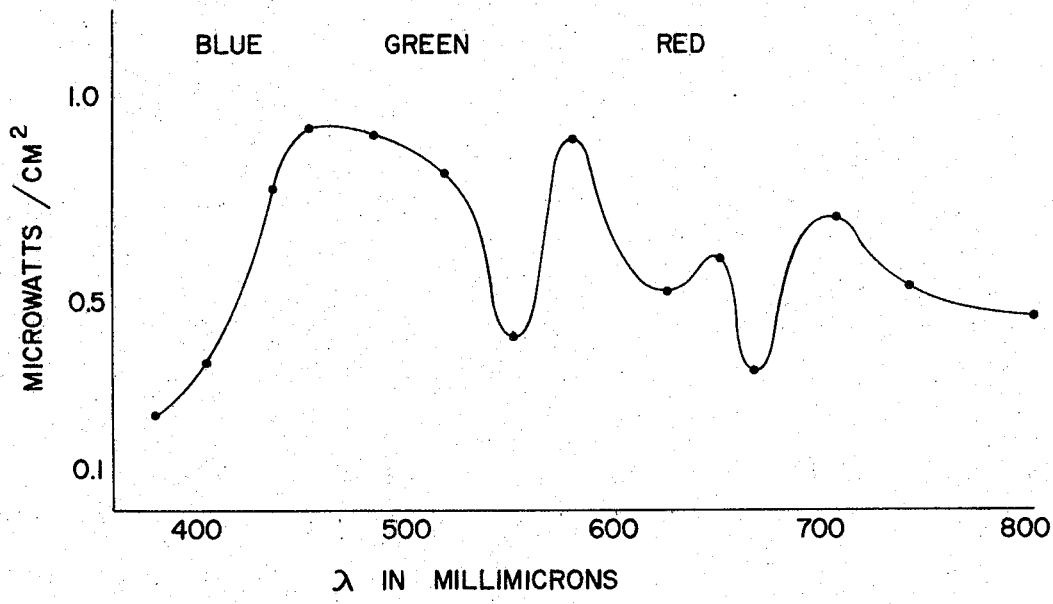
FIG_2

3,352,058
ORGANIC FLUORESCENT COLORANTS FOR
STIMULATING THE GROWTH OF PLANTS
Elmer J. Brant, Moraga, Calif., assignor of one-half to
Harry P. Locklin, Richmond, Calif.
Filed Dec. 8, 1966, Ser. No. 607,118
12 Claims. (Cl. 47—58)

ABSTRACT OF THE DISCLOSURE

Stimulation of plant growth by exposure to reddish fluorescent light where the light is generated through initial contact with an organic fluorescent pigment or dye.

---

This application is a continuation-in-part of the combined subject matter of copending patent application, Ser. No. 436,288, filed Mar. 1, 1965, for Fluorescent Pigments in Plant Growth Acceleration, and copending patent application, Ser. No. 522,296, filed Jan. 21, 1966, for Organic Fluorescent Colorants for Increasing the Growth of Plants, and now abandoned.

The invention relates to the art of growing plants. More particularly, it relates to a method and "greenhouse" by which plant growth can be significantly increased by treatment of growing plants.

In the preferred embodiment, the invention consists of properly selecting an organic fluorescent colorant which, when contacted with either artificial or natural illumination, will give off light that is fluorescent in character and that is formed of predominantly red and blue wave lengths while being reduced in green wave lengths. Fluorescent light of predominantly red and blue wave lengths has been proven beneficial to plant growth when directed onto the plant structure and particularly onto its leaves. Many plants, when subjected to such light over a period of time, generally exhibit improved growth or condition in one form or another. In some cases the improved growth takes the form of increased flower and/or fruit production by the plant and in other instances is evidenced by increased stature and foliage of the plant.

The invention is advantageously used in connection with a "greenhouse" type structure provided with a suitable surface upon which the selected fluorescent colorant can be disposed for contact with light. In the preferred embodiment, the surface containing the fluorescent colorant is positioned so that it is exposable to sun light and plants within the green house are situated so as to receive the benefits of fluorescent light generated upon contact of the colorant by sun light.

In recent years, a great deal of interest in the enhancement of plant growth through the controlled use of artificially color light has been shown. In particular, work in connection with the use of fluorescent and incandescent lamps which throw light of growth-stimulating wave lengths has been employed for experimental purposes. While these efforts have generally met with success, one of the serious disadvantages lies in the cost of using such techniques. Artificial light requires wiring, fixtures, lamps and a substantial amount of electricity. These factors contribute significantly to the overall cost of growing plants and for practical purposes limits the application of artificial light to only the most costly plants. The present invention has the salutary advantage of being utilizable with ordinary sun light, as well as with artificial light. Through its discovery, the cost of increasing plant growth through control of the type of illumination reaching the plant can be minimized.

The invention is applicable generally to all plant life that requires light in order to grow and prosper. Throughout the term "plant" is used in this broad sense and is intended to include seeds and seedlings, as well as the more mature plant.

Light is utilized by the plant in its process of photosynthesis. When the light that strikes the plant is the resultant fluorescent light given off following contact with an organic fluorescent colorant, such as a fluorescent dye or a fluorescent pigment, and the light contains visible red wave lengths, e.g., visible wave lengths above about 550 millimicrons, the benefits of the present invention are obtained. The preferred embodiment contemplates the use of light having a predominance of such red wave lengths but which also includes some blue wave lengths, together with green wave lengths in which the green wave lengths are in a reduced concentration as compared with the green wave length concentration in the light prior to its contact with the fluorescent colorant. In the broader aspects the invention embraces the use of any concentration of red wave lengths that produces a beneficial effect upon plants. In some instances a beneficial effect may be obtained where substantially all of the light which contacts the plant has a wave length above about 550 millimicrons.

The degree of improvement will generally be proportionate to the amount of fluorescent light utilized up to the point where the plants ability to use the light is exceeded. Up to the point of light saturation of the plant, where most of the light utilized is of the type herein specified, maximum benefits will be observed. However, lesser amounts obtained by mixtures of the presently specified type of light and ordinary light will also achieve the advantages of the present invention, although perhaps to a lesser degree.

One guide for determining when sufficient fluorescent light is reaching the plants is to observe the color of the normally green leaves, if the plant has such leaves. Where the color of the leaves appears to be altered from the natural green, an effective exposure is generally obtained. For example, best results are obtained in accordance with the present method where the organic fluorescent colorant has a visually reddish appearance and the light obtained following contact with the colorant has the same appearance to the eye. In any event, since optimum factors may vary from plant to plant and due to differences in environmental conditions, the ultimate test of effective exposure with the fluorescent light is to observe whether or not the plant exhibits improved growth and appearance by the treatment. Experience will quickly provide parameters for repeated use.

In carrying out the process, any source of light capable of exciting fluorescent pigments and dye solutions may be utilized. Preferably the light source is sun light. The source of light is simply directed into contact with the selected fluorescent colorant, whether pigment or dye, to obtain light of the requisite type. The light so obtained following contact is then directed onto the plants in any suitable manner. In the experiment to be described hereinafter, exposure of the plants is accomplished in several ways. In one case, a cylindrical support is placed around each plant. The surface of the support facing each plant has been coated with a fluorescent pigment. Fluorescent light reaches the plant by the transmission of visible light through the supporting surface and pigment and/or by emission and reflection from the colored surface of the support onto the plant. In the other experiment illustrated, a green house type structure is utilized in which fluorescent dyes and pigments are suitably disposed on or in the panels forming the walls and roof of the green house. Again, sun light reaches the plant in generally the same manner, although in this case a larger proportion of the light that reaches the plant is of a fluorescent character.

The specific technique decided upon for achieving contact between the light source and the fluorescent colorant is not critical, although the efficiency of conversion of the light to the fluorescent character and optimum wave length composition may be better with one technique than another. Nevertheless, all such techniques are contemplated within the scope of the invention.

By way of a partial summary of light-colorant contacting techniques, the following modes of operation are suggested. Conversion of visible light to light of a fluorescent character of appropriate wave lengths can be accomplished by coating all or part of the substantially colorless transparent or translucent support (for instance glass) with the selected fluorescent colorants, the support being used to form the covering of a greenhouse or other such enclosure. In such a structure, the side of the support having the fluorescent colorant coated thereon should preferably face the plants while the opposite side is exposed to sun light. In this situation, the light impinging upon the translucent or transparent support reaches the plant by transmission. During transmission through the support contact with the fluorescent colorant occurs and at least a portion of the light is converted to fluorescent light.

If the colorant is properly selected so that the transmitted light is predominantly composed of red and blue wave lengths with a minimum of green wave lengths, optimum results are frequently achieved. In the preferred embodiment, the colorant is selected so that as between the red and blue wave lengths, the red wave lengths constitute a vast majority of the total quantity of fluorescent light. The preferred type of light, therefore, has a visually reddish appearance.

Instead of glass, the enclosure could equally well comprise a substantially colorless, transparent or translucent, resinous, plastic or textile support, with the selected fluorescent colorant, pigment or dye, suitably applied thereto or therein.

Another alternative structure for practicing the present method may comprise a greenhouse or other such disclosure within which plants are grown in conventional manner, where the house is wholly or partially covered with transparent or translucent fluorescent plastic members that have been cast, extruded or calendered in appropriate form. A fluorescent resin or plastic adhered to a textile scrim may be used as one form of a suitable covering.

Another alternative for supporting the fluorescent colorant utilized in this invention is to adhere the selected colorant to the enclosure surfaces (which may be glass or the like) in the form of a substantially colorless, transparent or translucent adhesive of the soluble or pressure-sensitive type in combination with a coating of the fluorescent colorant (which is preferably a pigment in this case) applied to a white transparent or translucent paper, resinous or plastic film, the film being adhered to the enclosure surfaces by means of the adhesive.

The above are exemplary techniques. The particular architecture of the greenhouse, as well as the mechanism for disposing the pigment in or on its surfaces, is not critical so long as the requisite light reaches the plants. Consequently, the term "greenhouse" as used herein should be construed broadly as including any type of structure upon which organic fluorescent colorants such as pigments and dyes may be supported for contact with light and the light obtained following such contact directed onto plants in an effective amount.

The above described structures are especially useful with sun light. For artificial light, greenhouses may have relatively opaque white surfaces and the fluorescent colorant coated on the interior surfaces for reflection and emission of light. In this latter case, economic necessity dictates that a major portion, i.e., at least 50%, of the greenhouse surfaces facing the plants contain fluorescent colorant so that sufficient portions of the artificial light are converted to the desired character and wave lengths.

Especially in the structures designed for use with sun light, it may be advantageous to employ a conventional ultraviolet inhibiting chemical such as any of the well known benzophenone and benzotriazole types for purposes of preserving the stability of the fluorescent colorant. This may suitably be accomplished by incorporating the ultraviolet inhibitor in a substantially colorless transparent or translucent adhesive or resinous coating and applying the coating so that it is between the source of light such as the sun and the fluorescent coloring. For example, in the description of the enclosures set forth above, the layer containing the ultraviolet inhibiting chemical would be applied to the supporting glass or equivalent and the fluorescent layer applied thereunder so that the ultraviolet inhibiting layer is between the fluorescent layer and the light source.

The colorants employed with this invention may be any of those materials commonly referred to as fluorescent dyes and pigments. In general, all of these materials are of organic derivation. Organic fluorescent dyes are well known materials and are generally useful upon combining them with a solvent to form a solution. Organic fluorescent pigments are generally formed with fluorescent dyes by combining the dyes with a carrier such as a resin and finely dividing the resulting mass. Pigments are generally insoluble materials and are useful by suspending them in a vehicle in contrast with the solutions that can be formed with dyes. The term "fluorescent colorant" is used herein to include all of such materials.

The following experiments will illustrate the improved results obtained by exposing plants to fluorescent light obtained by contact of visible light with selected fluorescent pigments and dyes.

EXAMPLE I

*Materials*

15 Flower pots 4½" deep x 5" in diameter
15 snapdragons of approximately identical size and age
Conventional planter soil mix
9 sheets of translucnt 10 pt. cardboard coated with nine different daylight fluorescent pigments as indicated below. (The pigments utilized were Velva-Glo fluorescent colors obtained from Radiant Color Company of Richmond, Calif.)
5 sheets of 10 pt. transparent cellulose acetate of five different non-fluorescent colors as indicated below

*Procedure*

The 15 snapdragons were planted in the pots (one to each pot) in the planter soil mix, with the mix added up to the brim of each pot.

The nine cardboard sheets coated with the various fluorescent pigments and the five cellulose acetate sheets were cut to pieces 20" x 18" in size, rolled into tubes 20" high and approximately 5¾" in diameter, and sealed along the open longitudinal edge with fiberglass tape.

The tubes so formed were placed over the potted plants so that each plant and pot was surrounded by a cylindrical tube that was open to the atmosphere at the top, with he fluorescent surface of each of the nine fluorescent-coated tubes facing the plant.

Each plant was watered intermittently with eight ounces of water. Watering was accomplished on the first, third, fifth, eighth, eleventh, sixteenth, eighteenth and twenty-first days of the experiment.

The 15 plants, 14 of which were enclosed in the fluorescent and non-fluorescent cylindrical tubes described above, and the remaining plant without any such enclosure, were placed outside in Piedmont, Calif., during the month of July. The appearance and measurement of each plant was initially noted, noted again eight days later, and again noted at the end of 20 days from the commencement of the experiment. The observations are reported below at these three inspection times.

| Plant No. | Tube and Pigment | Initial Height, Inches | Height and Appearance After 8 Days | Height and Appearance After 20 Days |
|---|---|---|---|---|
| 1 | Blue Cellulose Acetate [1] | 3¼ | 6½" in height; 4 leaves burned or partially dried out. | 11⅛" tall; stem thickness ⅛" maximum; scrawny; leaves looked bad; largest leaf size was 1½" x ⅞". |
| 2 | Blue Velva-Glo [2] | 2¾ | 5" tall; good appearance | 7⅝" tall; maximum stem thickness 3/32"; very few leaves; maximum leaf size 1½" x ⅞". |
| 3 | Green Acetate [1] | 2½ | 6⅜" tall; good appearance | 11⅛" tall; maximum stem thickness slightly greater than ⅛"; stem weak; few leaves; largest leaf size 1⅝" x ¾." |
| 4 | Green Velva-Glo [2] | 2⅝ | 5⅝" tall; good appearance | 8⅛" tall; stem thickness under ⅛"; strong looking plant; maximum leaf size 1¾" x ⅞". |
| 5 | Yellow Acetate [1] | 2⅜ | 5¾" tall; 2 leaves partially dried out. | 10⅝" tall; stem thickness about ⅛"; healthy looking with abundant foliage; maximum leaf size 1⅛" x 1". |
| 6 | Chartreuse Velva-Glo [2] | 2¼ | 3¼" tall; leaves taking on bluish cast. | 7⅜" tall; stem thickness 3/32"; healthy looking but small; maximum leaf size 1¾" x ¾". |
| 7 | Orange-yellow Velva-Glo [2] | 2¼ | 5¾" tall; good appearance | 11" tall; stem thickness ⅛"; good, strong appearance; maximum leaf size 2⅛" x 13/16". |
| 8 | Orange Velva-Glo [2] | 2⅛ | 5¾" tall; good appearance | 10⅛" tall; stem thickness slightly over ⅛"; lateral stems seemed stronger than Plant 7; plant not as tall as Plant 7 but stronger looking; maximum leaf size 1¾" x 15/16". |
|  | Red Acetate [1] | 1⅞ | 4½" tall; one leaf partially dried out. | 9⅝" tall; stem thickness 3/32"; rather weak looking plant; maximum leaf size 1¼" x ¾". |
| 10 | Orange-Red Velva-Glo [2] | 1⅞ | 5¼" tall; good appearance | 12¾" tall; stem thickness about ⅛"; strong looking; maximum leaf size 1⅞" x 1⅛". |
| 11 | Red Velva-Glo [2] | 1¾ | 5⅜"; good appearance | 12" tall; stem thickness over 3/16"; very healthy looking; maximum leaf size 2" x 15/16". |
| 12 | Cerise Velva-Glo [2] | 1⅜ | 5⅝"; good appearance | 13" tall; maximum stem thickness slightly under 3/16"; very healthy looking; maximum leaf size 2½" x 1⅜". |
| 13 | Pink Cellulose Acetate [1] | 1¾ | 4" tall; 1 leaf partially burned | 7½" tall; maximum stem thickness 3/32"; appeared prematurely old; maximum leaf size 1" x 13/32". |
| 14 | Pink Velva-Glo [2] | 1⅛ | 3⅞"; good appearance | 8¾" tall; stem thickness about ⅛"; appeared sturdy but small; maximum leaf size 2" x 1¼". |
| 15 | No tube | 1¼ | 3¼"; good appearance | 7" tall; stem thickness slightly under ⅛"; maximum leaf size 1¾" x 1⅛". |

[1] Non-fluorescent.
[2] Fluorescent.

Discussion

From the above, it can be seen that those plants which were surrounded by a support coated with a fluorescent pigment of the type that produced fluorescent light with predominantly red and blue wave lengths with a minimum of green wave lengths (i.e., those pigments having a reddish or closely related visual appearance) resulted in plants whose growth and appearance were significantly improved. In contrast, fluorescent pigments which did not produce fluorescent light in predominantly red and blue wave lengths, such as the green light obtained from the pigment utilized in connection with plant No. 4, exhibited no advantage with respect to plant growth. Further, colored light produced by non-fluorescent colorants and which was non-fluorescent in character, but which was predominant in red wave lengths such as the light obtained with the red acetate tube utilized in connection with plant No. 9, did not achieve the objects of the invention.

Finally, it should be noted that those plants connected with red fluorescent pigment and closely related pigments in terms of color such as plants Nos. 10, 11 and 12 showed the best results. These most effective pigments produced fluorescent light predominantly containing red and blue wave lengths with a minimum of green wave lengths. In these cases the red wave lengths are greatly in excess of the blue wave lengths and the light derived therefrom appears red to the eye.

EXAMPLE II

In this experiment, a greenhouse type structure and its advantages are demonstrated. Three greenhouses were utilized.

House No. 1 was a control house having clear glass sides and roof.

House No. 2 contained clear glass surfaces which were coated with a conventional fluorescent red pigment cast into a vinyl plastisol film. The pigment was obtained from Radiant Color Company of Richmond, Calif., and is known as Red Velva Glo. The greenhouse walls have a translucent appearance with respect to the appearance of the light entering the interior of the greenhouse through the pigment containing surfaces.

House No. 3 had clear glass surfaces covered with a plastic solution of dye. Specifically 1% of BXP rhodamine-acid red fluorescent dye was dissolved in a vinyl plastisol film and disposed on the greenhouse surfaces. The interior of the greenhouse surfaces of house No. 3 had a transparent appearance to the eye.

Four tomato plants were planted in each greenhouse and grown in conventional fashion under the lighting conditions existing by reason of the nature of the greenhouse walls. Growth proceeded for a period of 73 days in the late summer and early fall in Richmond, Calif.

During this period of time the average character of the light in each of the greenhouses reaching the plants was analyzed. In greenhouses No. 2 and No. 3 the light had a visually red fluorescent appearance. Spectral analysis showed the light to be predominantly red and blue with a small quantity of green wave lengths. Most of the light was in the red wave length range relative to the amount of blue wave lengths present. An average distribution of the light in these two greenhouses is illustrated in FIG. 1 of the drawing.

In control greenhouse No. 1 having the clear glass surfaces, the light reaching the plant was conventional sun light. An average distribution of the non-fluorescent appearing light made at approximately the same time as the light was analyzed in greenhouses No. 2 and No. 3 was taken and is shown in accompanying FIG. 2 of the drawing.

All of the light measurements used in the preparation of the figures were taken with an Asco Model 3051 Spectroradiometer. FIGURE 1 represents the average condition found in two greenhouses, Numbers 2 and 3. The intensities shown were obtained from the average of 8 readings for locating each point used to draw the curve. (Four readings were taken in each of the two greenhouses with the optical head of the instrument facing north, south, east and west.) The curve in FIGURE 2 was derived from values representing an average of 4 readings for each point used in the preparation of the curve, and again the readings were taken in the north, south, east and west directions.

In comparing the light which reached the plants, it is noted that apart from the differences in the fluorescent character of the light in houses No. 2 and No. 3, the untreated sun light was relatively high in blue and green wave lengths, and low in red wave lengths. The light in houses No. 2 and No. 3 was relatively high in red wave lengths and the green wave lengths were almost negligibly present.

Results

*House No. 1 (Control).*—The average size of the tomato plants was 2½′ x 4′. The plants contained a total of 190 buds and flowers and 124 tomatoes.

*House No. 2.*—The plants were an average size of 3′ x 5′ and contained 385 buds and flowers and 165 tomatoes.

*House No. 3.*—The plants had an average size of 3′ x 5½′ and contained 250 buds and flowers and 150 tomatoes.

Discussion

In general, the stems and leaves of the plants were slightly broader in greenhouse No. 2 as compared with the control of House No. 1. The stems of the plants in house No. 3 were more elongated and the leaves larger than either of the other two houses.

Although the tomatoes were ripening sooner in the control house, the significant advantage of exposing the plants to the fluorescent light was demonstrated. The plants of houses No. 2 and No. 3 were generally larger and healthier in appearance. Since the plants is the "factory" for the fruit sought, more production is ultimately possible. In terms of yield at the time the data was gathered, a total number of tomatoes plus potential tomatoes (buds and flowers) in houses No. 2 and No. 3 was significantly greater than in the control house No. 1.

Although the foregoing invention has been described in some detail by way of illustration and example for purposes of clarity of understanding, it is understood that certain changes and modifications may be practiced within the spirit of the invention as limited only by the scope of the appended claims.

I claim:

1. In the method for stimulating plant growth by exposing plants to a source of light having growth stimulating wave lengths, the improvement comprising exposing the plants to light intensified in the red region, in which the light is obtained by contacting light from a source with an organic fluorescent colorant.

2. A method in accordance with claim 1 wherein the organic fluorescent colorant is selected so that the light obtained by contact therewith is formed predominantly of wave lengths above about 550 millimicrons.

3. A method in accordance with claim 1 wherein the organic fluorescent colorant is selected so that the light obtained by contact therewith includes blue wave lengths.

4. A method in accordance with claim 3 wherein the organic fluorescent colorant is selected so that the light obtained by contact therewith includes green wave lengths, the green wave lengths being in a reduced concentration compared with the concentration of green wave lengths present in the light prior to its contact with the fluorescent colorant.

5. A method for increasing plant growth in accordance with claim 1 wherein said fluorescent colorant is selected from the group consisting of fluorescent organic dyes and pigments.

6. A method for increasing plant growth in accordance with claim 5 wherein said fluorescent colorant is incorporated in a resinous carrier adopted to pass light therethrough.

7. A method in accordance with claim 1 wherein said fluorescent colorant is supported by a carrier and exposure of the growing plants is executed by emitting and reflecting fluorescent light from said colorant onto the plants.

8. A method in accordance with claim 1 wherein said colorant is supported by a carrier of the type permitting transmission of light therethrough, and exposure of the growing plants is executed by transmitting light through said support and colorant onto the plants.

9. A method for increasing plant growth in accordance with claim 1 wherein said light source is sunlight.

10. A greenhouse for stimulating plant growth having at least one light transmitting surface exposable to sun light, said surface containing an organic fluorescent colorant of the type yielding light fluorescent in character and having intensified wave lengths above about 600 millimicrons.

11. A greenhouse in accordance with claim 10 wherein said organic fluorescent colorant is of the type yielding light which includes a predominant amount of wave lengths above about 600 millimicrons, some blue wave lengths, and a reduced concentration of green wave lengths compared with the concentration of green wave lengths in the sunlight.

12. A greenhouse for stimulating plant growth wherein a major portion of its surfaces contain an organic fluorescent colorant of the type emitting and reflecting fluorescent light having intensified wave lengths above about 600 millimicrons.

References Cited

UNITED STATES PATENTS 3,089,280   5/1963   Klaas _____ 47—58

FOREIGN PATENTS 2,493,935   10/1936   Australia.

OTHER REFERENCES

The Gro-Lux Fluorescent Lamp, Sylvania Lighting Products, Salem, Mass., May 1963.

ROBERT E. BAGWILL, *Primary Examiner.*